Aug. 16, 1949.   N. EASTMAN   2,479,194
FRUIT-CUTTING AND JUICE-EXPRESSING MACHINE
Filed Oct. 29, 1945   4 Sheets-Sheet 4

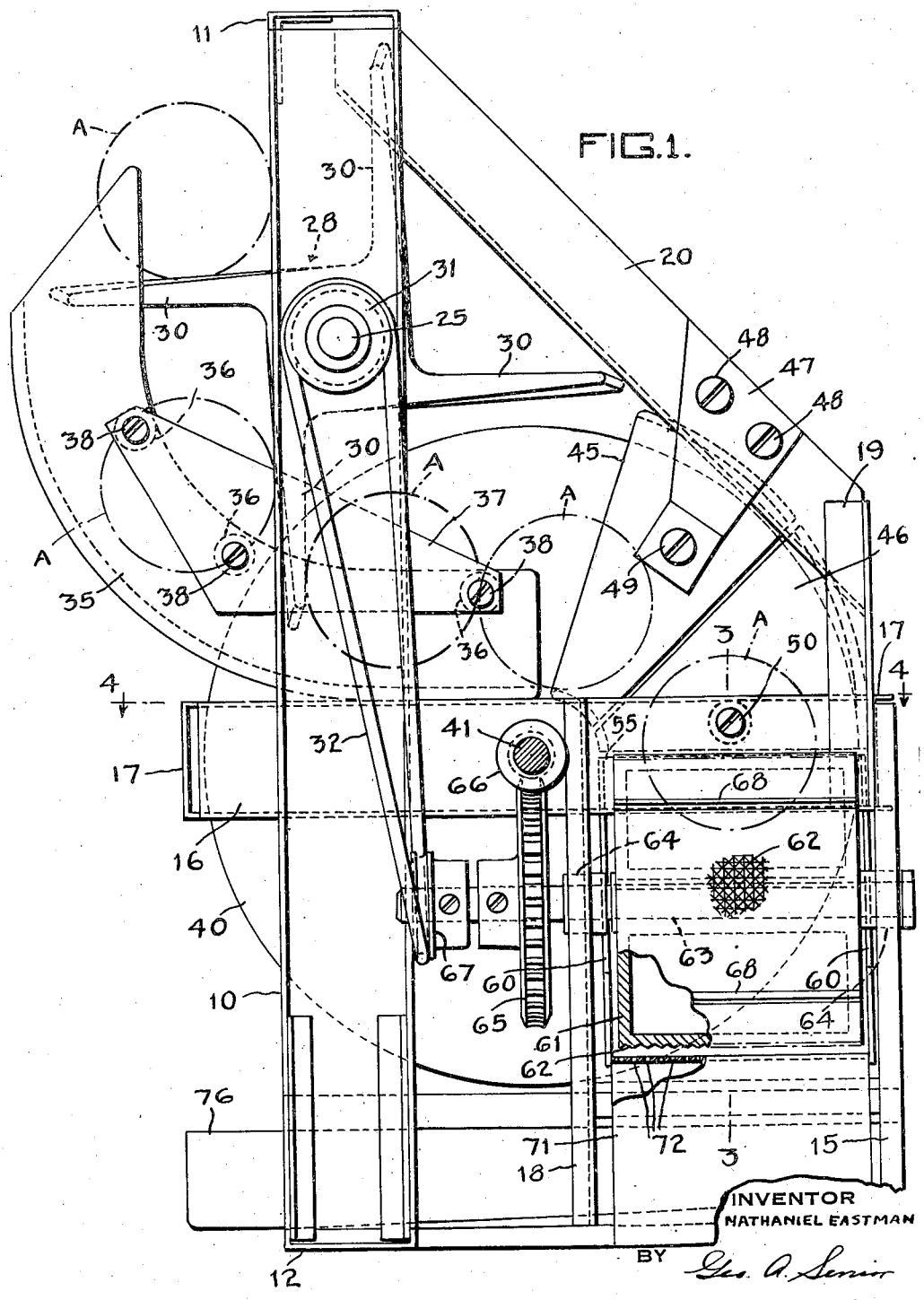

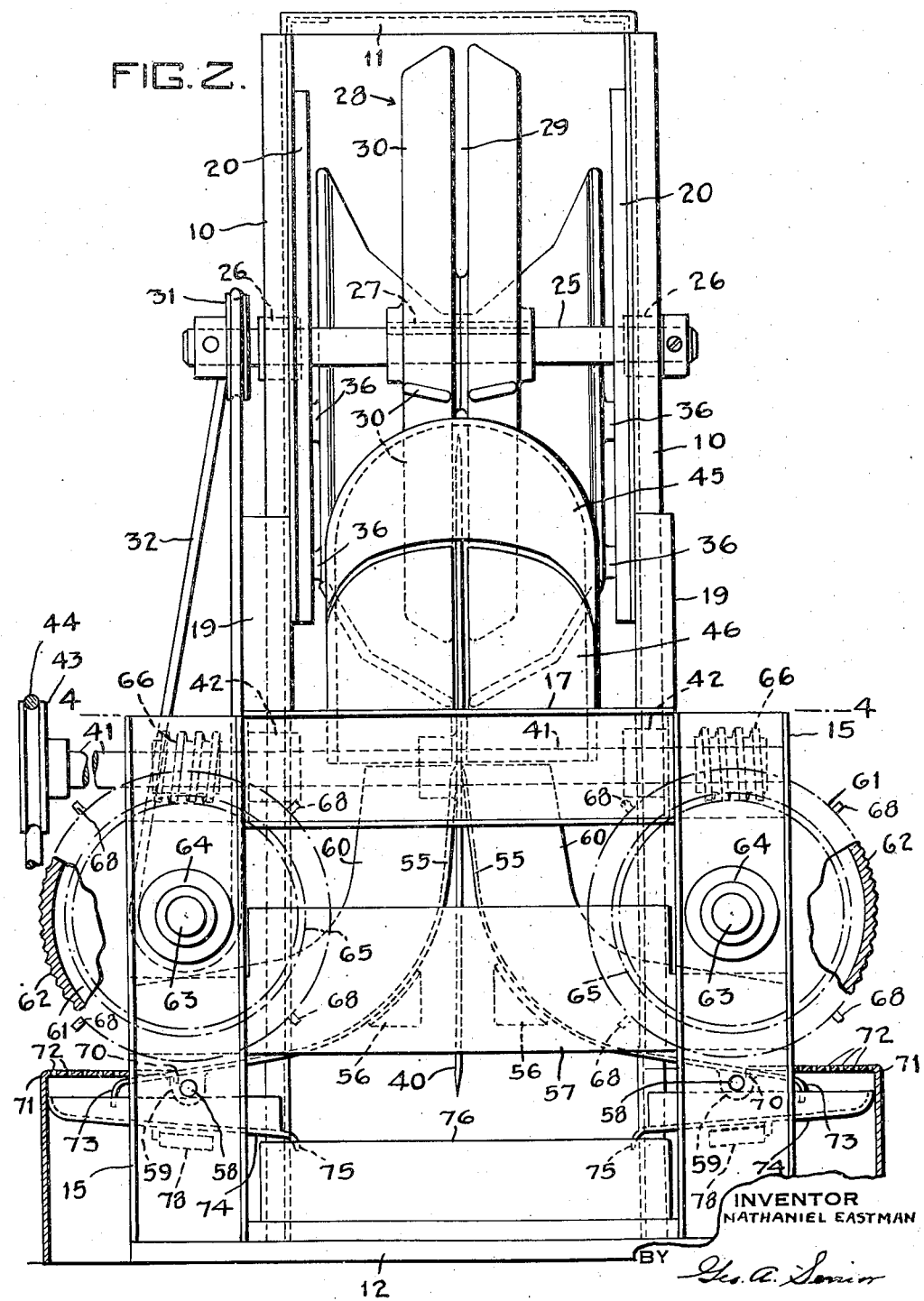

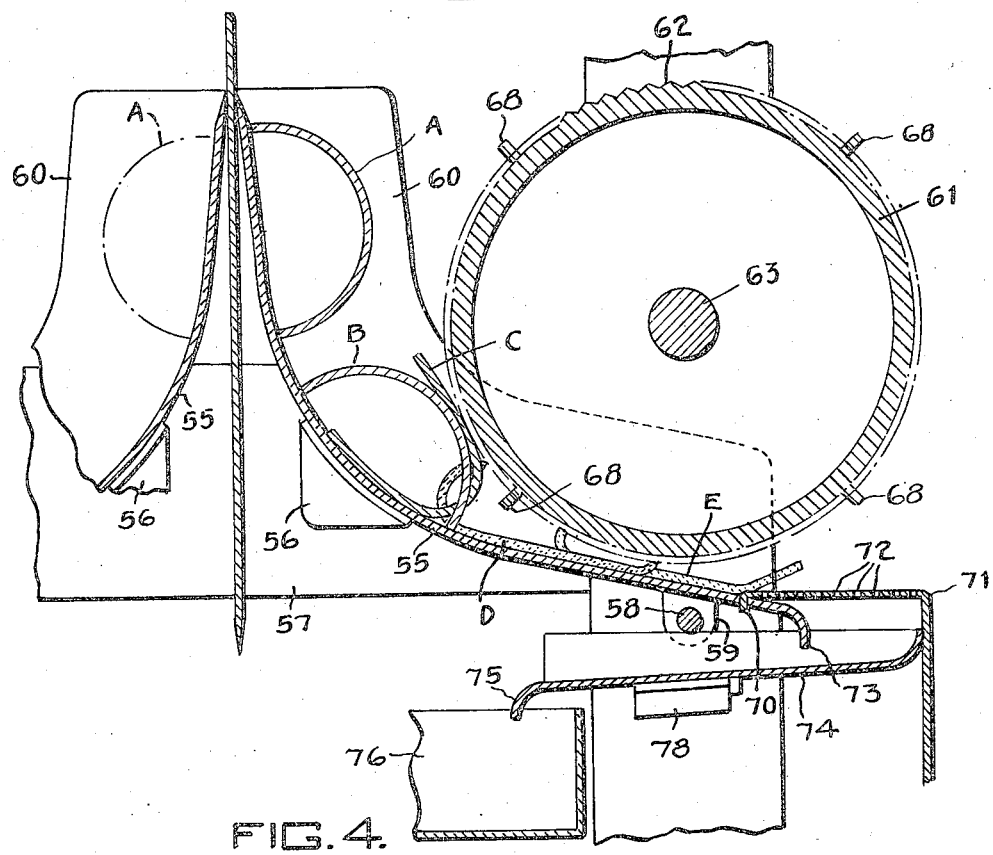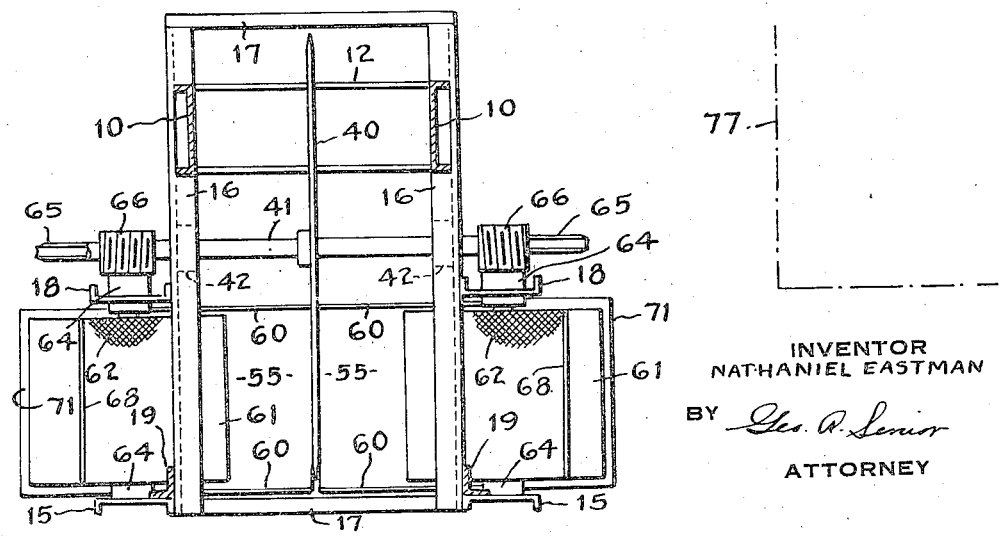

INVENTOR
NATHANIEL EASTMAN
BY
ATTORNEY

Patented Aug. 16, 1949

2,479,194

UNITED STATES PATENT OFFICE 2,479,194

FRUIT-CUTTING AND JUICE-EXPRESSING MACHINE

Nathaniel Eastman, New York, N. Y.

Application October 29, 1945, Serial No. 625,360

12 Claims. (Cl. 100—47)

The invention relates to a fruit-cutting and juice-expressing machine. With slight modifications fruits of various natures might be readily handled by the improved machine of the present invention, however the invention has particularly in mind the cutting and juice expressing of citrous fruits such as oranges, lemons or limes.

In many instances, such as restaurants, hotels, drink stands, etc., large quantities of citrous juices are required either for direct consumption or to form one of the principal ingredients for different kinds of mixed drinks. It is a fact that even with the well known mechanical types of orange juice extracting machines considerable time is involved in the operation of same. With the mechanical or manually operated machines in general usage the fruit must first be cut in half by hand and each half then applied to the juice expressing mechanism. The principal object of the present invention is to provide a mechanism into which the entire fruit such as oranges may be rapidly fed and all the juice be efficiently expressed or extracted and stored in a suitable receptacle and the debris such as the rinds, pits and superfluous pulp is automatically removed into a waste receptacle. Thus large amounts of pure juice may be rapidly and efficiently extracted with a minimum amount of time and effort.

In most orange juice expressing machines, whether mechanically or manually operated, the pits and rinds have a tendency to become crushed, broken or cut up, thus resulting in the extraction of a bitter orange oil. This is particularly annoying when consuming the drink. A further object of the present invention is to provide a machine which, while extracting all the juice and pulp from the fruit, will not break or cut the pits or the rinds and will not extract the disagreeable oils from the same.

Further objects are to provide a machine which is simple, sturdy and rugged and one in which the parts are easily accessible or removable for cleaning purposes.

Other objects and advantages will become apparent as this specification proceeds. Referring to the drawings forming a part thereof and in which preferred forms of the invention are illustrated:

Fig. 1 is a side elevation of the machine, parts being broken away for economy of space and parts being in section;

Fig. 2 is an elevational view looking toward the right hand side of Fig. 1, parts being broken out for economy of space and parts being in section;

Fig. 3 is a fragmentary detail sectional view in a larger scale and is taken on the line 3—3 of Fig. 1;

Fig. 4 is a sectional plan view on a smaller scale and is taken on the lines 4—4 of Figs. 1 and 2;

Figure 5:
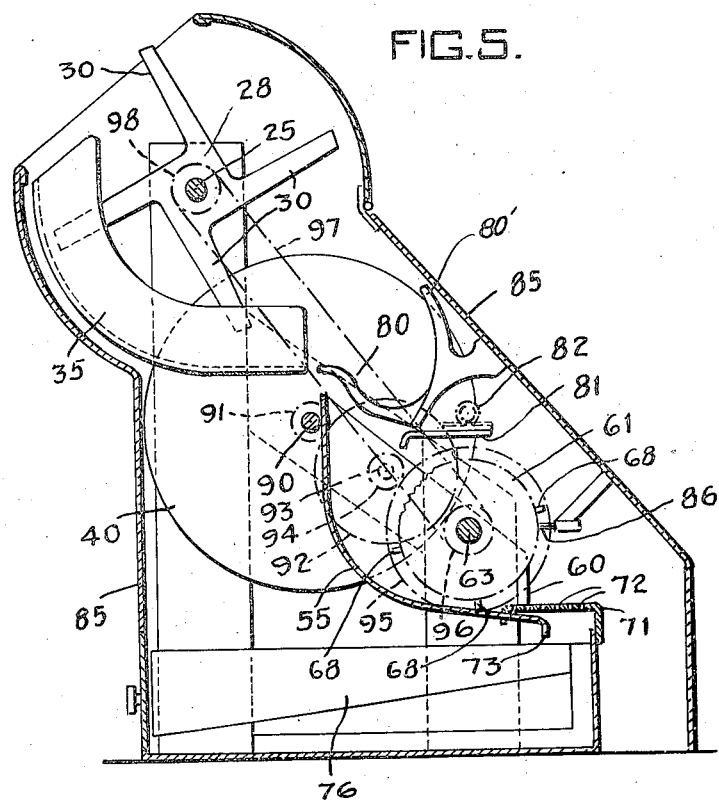
Fig. 5 is a sectional elevational view of a modified form of the invention.

The present invention has to do with analogous subject matter and to improvements in my prior Patent 2,382,620, dated August 14, 1945.

Referring again to the drawings and particularly to Figs. 1 to 4 the framework of the machine as illustrated is formed of structural members such as channels and angles secured together by resistance welding or other suitable means. Obviously it is to be understood this framework might well be constructed as a casting or a plurality of castings.

As shown the main supporting members of the framework comprise a pair of upright channels 10—10, connected at their upper ends by a channel 11 and at their lower ends by a channel 12. Other upright channels 15—15, spaced from the channels 10—10, are secured to the latter by cross channels 16—16, which in turn have their ends secured to each other by channels 17—17. Additional upright channels 18—18 intermediately spaced between the channels 10 and 15 are secured to the channels 16 and 12. Upwardly extending angles 19—19 are secured to the cross channels 16 and diagonally extending reinforcing and supporting angle members 20—20 connect the upper ends of the angles 19 and the upper ends of the main supporting channels 10.

A shaft 25 is mounted in bearings 26 carried in the upper portions of the channels 10—10. This shaft has keyed to it at 27 an impeller 28. The impeller is divided at 29, for purposes hereafter described and comprises a plurality of blades 30. Secured to one of the outer ends of the shaft 25 is a pulley 31 over which a belt 32 passes for continuously rotating the impeller as hereinafter described when the machine is in operation. As illustrated in Fig. 1 the operator feeds the oranges A or other fruit on the successive blades of the impeller as they appear. Obviously the impeller might be a rotatable member having a plurality of pockets therein, the pockets being the equivalent of the spaces between the blades.

An arcuate guide 35 is provided for the fruit. This guide like the impeller is divided at its central portions and is approximately V-shaped in cross-section. Each side of the guide has a plurality of bosses 36 which are secured to triangular shaped plates 37 by screws 38 and the plates 37 are in turn secured to the upright channels 10 by resistance welding or other suitable means, thus rigidly supporting the arcuate guide.

The arcuate guide leads the fruit A to and past a rotary slicing disc 40 which cuts the fruit in half. The impeller 28 and guide 35 are divided as heretofore described to permit passage of the slicing disc 40. As shown in Fig. 1 the fruit will gravitate down the arcuate guide 35 and will be forced against the rotary slicing disc 40 by the impeller blades 30, thus cleanly cutting the fruit in half and leaving one-half on each side of the rotary slicing disc.

The rotary slicing disc 40 is secured to a shaft 41 mounted in bearings 42 carried by the cross channels 16. A pulley 43 is mounted on one of the outer ends of the shaft 41 and a belt 44 passes over this pulley and thence to a motor or other suitable source of power (not illustrated) to drive the machine.

From the arcuate guide 35 the sliced fruit passes by gravity and under the urge of the fruit behind it through a pair of annular guide members 45 and 46. The guide 45 is supported on the diagonally extending angles 20 by brackets 47 which are secured to the angles 20 and guide 45 respectively by screws 48 and 49 or other suitable means. The guide member 46 is carried by and secured to the channels 16 by screws 50.

From the guides 45 and 46 the sliced fruit passes on to curved expressing or pressure plates 55, one on either side of the rotary cutting disc 40 and each one accommodating one-half of the sliced fruit, the flat faces of the sliced fruit being in engagement with the expressing plates. The intermediate portions of the expressing plates rest on brackets 56—56 resistance welded or otherwise secured to plates 57 extending between and secured to the upright channels 15—15 and 18—18. Removable pins 58 pass through ears 59 secured to the expressing plates 55 and the channels 15—15 and 18—18. When the pins 58 are withdrawn, the expressing plates may be slid out for cleaning. The foregoing arrangement of mounting the expressing plates also permits of a certain amount of flexibility in the expressing or pressure plates. The expressing plates are provided with side flanges 60 to insure against the escape of any expressed juice and to aid in the proper positioning of the sliced fruit. Obviously various means might be devised to support the flexible pressure plates.

Each of the expressing plates 55 has operating in conjunction therewith an expressing or pressure roll 61. The operating faces of the expressing rolls are serrated or toothed as indicated at 62 in Figs. 1, 2 and 3. The expressing rolls 61 are keyed or otherwise secured to shafts 63 mounted in suitable bearings 64 carried by the upright frame channels 15—15 and 18—18. Each shaft 63 has secured thereto a worm wheel 65 and these worm wheels engage worms 66 mounted on the driving shaft 41. It will thus be apparent the expressing rolls are constantly driven when the machine is in operation. The belt 32 heretofore mentioned for driving the impeller passes over a pulley 67 secured on the end of one of the expressing roll shafts 63.

The expressing or pressure rolls 61 are preferably provided with a series of ejecting or expelling fins 68. The fins 68 may be formed integral with or secured to the pressure rolls in any convenient manner.

Entered into slots adjacent the outer ends of the expressing or pressure plates 55 are tongues 70 formed on the inner ends of perforated platforms 71. The expressed fruit juice passes through the perforations 72 and over depending lips 73 on the outer ends of the expressing plates and thence into troughs 74 which have depending lips 75 on their inner ends to cause the expressed juice to flow into the removable juice receptacle 76. The rinds, excess pulp and pits are pushed off the ends of the platforms 71 into a suitable waste receptacle, diagrammatically illustrated at 77 in Fig. 3.

The troughs 74 are supported in any suitable manner. As illustrated they rest on angles 78 secured to the upright channels 15—15 and 18—18. For cleaning purposes the perforated platforms 71 may be easily and quickly removed from the expressing plates, the troughs withdrawn and the expressing plates slid out as heretofore described.

Attention is now particularly called to Fig. 3. In this figure the two halves of the sliced fruit A are shown as leaving the rotary cutting disc and the guides heretofore described, and entering upon the upper ends of the expressing or pressure plates 55. In the position indicated by the reference character B the half orange is just entering the bite of the expressing roll and expressing plate. Due to the curvature of the expressing plate and the positioning of the expressing roll in relation thereto the expressing roll will move the orange to the position indicated by the reference character C and the expressing of the fruit juice is started. The continued rotation of the expressing roll practically turns the fruit over on itself, the flat face of the crushed fruit being against the teeth of the expressing roll as indicated at D. In passing from the position indicated at D to that of E the fruit is forced through the constricted zone between the expressing roll and expressing plate and all the juice, pulp and pits are cleanly extracted from the rind. The method of mounting and the inherent flexibility of the expressing or pressure plate 55 insures against the breaking or crushing of the pits while they are being extracted. The ejecting fins or blades 68 are of a depth substantially equal to the distance between the pressure rolls 61 and the pressure plates 55 at the region of the constricted zones, heretofore described. It is thus insured that any particles of the orange rind, pits or pulp will be efficiently removed from the pressure plates.

Figure 6:
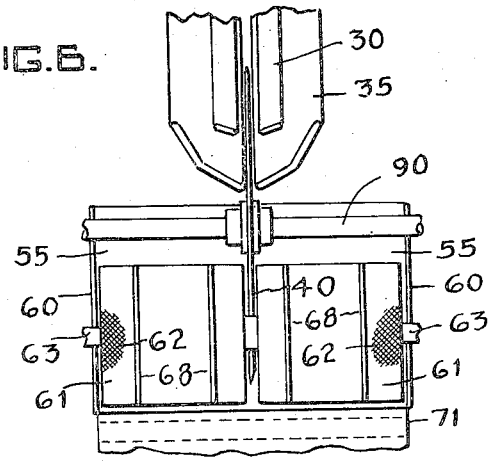
Fig. 6 is a fragmentary elevational view looking toward the right of Fig. 5 and omitting the casing, gearing and numerous other parts.

Figs. 5 and 6 illustrate a slightly modified form of the invention and in these figures similar reference characters represent similar parts.

The essential difference in the forms of the invention illustrated in Figs. 1 to 4, and Figs. 5 and 6 resides in the fact that in Figs. 5 and 6 the axes of the impeller 28, the rotary slicing disc 40 and the expressing rolls 61 are all parallel while in Figs. 1, 2, 3 and 4 the axes of the impeller and rotary slicing disc are parallel and the axes of the expressing rolls are disposed at right angles thereto.

Therefore in the construction illustrated in Figs. 5 and 6, means such as indicated at 80 are provided for turning the severed halves of the fruit at right angles after the fruit has left the arcuate guide 35 and prior to the fruit entering the expressing plates 55. The guide 80 is rigidly attached to the inclined part of the casing and includes an arm which extends out over each face of the disk, together with a bent up part 80′ associated with each arm and likewise close to the disk in the path of the round edge of each orange as it is severed in two by the disk 40. The halves of the orange after being cut in two by the disk 40 strike the arms of the guides and are turned outward so that they fall down upon the pressure plates 55 and pass edgewise under the squeezing rollers 61. From this point on the parts function substantially as described in the operation of Figs. 1 to 4.

In Fig. 5 an adjustable guide 81 is illustrated. This guide may be moved toward or away from the expressing plates 55 by a rack and pinion adjustment 82 to compensate for variations in the size of the fruit.

As illustrated in Fig. 5 the machine may be enclosed by a casing 85. Obviously a similar casing might be employed with the embodiment of the invention disclosed in Figs. 1 to 4. A scraping or cleaning brush 86 bearing against the expressing rolls 61 as shown in Fig. 5 might be utilized with either embodiment of the invention.

In Figs. 5 and 6 the drive shaft 90 carries the rotary slicing disc 40. Secured to the drive shaft 90 is a pinion 91 which meshes an idler gear 92 carried by a shaft 93 and to which is secured a pinion 94. The pinion 94 meshes a gear 95 which is fast to the shaft 63 carrying the expressing rolls 61. A pulley or sprocket 96 mounted on the expressing roll shaft 63 has a belt or sprocket chain 97 which passes over another pulley or sprocket 98 fast to the impeller shaft 25 to rotate the impeller.

Such changes in details of construction and arrangement of parts as would occur to one skilled in the art are to be considered as coming within the spirit of the invention as set forth in the appended claims.

I claim:

1. A fruit-cutting and juice-expressing machine having in combination, a supporting frame, an impeller mounted in the upper part of said frame and having means thereon for conveying and urging fruit into said machine, a rotary slicing disc having its axis parallel to the axis of said impeller and against which said fruit gravitates and is urged by said impeller to cut said fruit in half, expressing plates upon which each half of the fruit is received after being cut by said slicing disc, expressing rolls having their axes at substantially right angles to the axes of said impeller and said rotary cutting disc, said expressing rolls operating in conjunction with said expressing plates to extract the juice from said fruit, and means for rotating said impeller, said rotary slicing disc and said expressing rolls.

2. A fruit-cutting and juice-expressing machine having in combination, a supporting frame, an impeller mounted in the upper part of said frame and having means thereon for conveying and urging fruit into said machine, a rotary slicing disc having its axis parallel to the axis of said impeller and against which said fruit gravitates and is urged by said impeller to cut said fruit in half, expressing plates upon which each half of the fruit is received after being cut by said slicing disc, expressing rolls having their axes substantially parallel with the axes of said impeller and said slicing disc, means for causing the sliced fruit to turn at right angles after leaving the slicing disc and prior to entering upon the expressing plates, said expressing rolls operating in conjunction with said expressing plates to extract the juice from said fruit, and means for rotating said impeller, said slicing disc and said expressing rolls.

3. A fruit-cutting and juice-expressing machine having in combination, a supporting frame, an impeller rotatably mounted in said frame for urging fruit into said machine, a rotary slicing disc against which said fruit gravitates and is urged by said impeller to cut said fruit in half, expressing plates upon which each half of the fruit is received, expressing rolls operating in conjunction with said plates to extract the juice from said fruit, platforms adjacent the ends of said expressing plates upon which the rinds, superfluous pulp and pits of the expressed fruit are received and urged from said platform into a waste receptacle, and perforations in said platform through which the expressed juices pass.

4. A fruit-cutting and juice-expressing machine having in combination, a supporting frame, an impeller rotatably mounted in said frame for urging fruit into said machine, a rotary slicing disc against which said fruit gravitates and is urged by said impeller to cut said fruit in half, expressing plates upon which each half of the fruit is received, expressing rolls operating in conjunction with said plates to extract the juice from said fruit, platforms adjacent the ends of said expressing plates upon which the rinds, superfluous pulp, and pits of the expressed fruit are received and urged from said platform into a waste receptacle, perforations in said platform, troughs under said perforations and into which the expressed juices pass, and a receptacle into which said troughs lead said expressed juices.

5. A fruit cutting and juice expressing machine having in combination, a rotary slicing disc for cutting the fruit in half, a pair of expressing plates upon which each half of the fruit is guided after being cut in half by said rotary slicing disc, and a pair of expressing rolls operating in conjunction with said expressing plates to extract the juice from said fruit, said expressing plates having their upper portions resting adjacent either side of said slicing disc and having downwardly extending portions somewhat remotely spaced from the lateral portions of said expressing rolls, curved portions approaching said expressing rolls and merging into substantially horizontal portions in close proximity to the under sides of said expressing rolls.

6. A fruit cutting and juice expressing machine having in combination a supporting frame, an impeller rotatably mounted in said frame for urging fruit into said machine, a rotary slicing disc against which said fruit gravitates and is urged by said impeller to cut said fruit in half, a pair of expressing plates upon which each half of the fruit is guided after being cut in half by said rotary slicing disc, and a pair of expressing rolls operating in conjunction with said expressing plates to extract the juice from said fruit, said expressing plates having their upper portions resting adjacent either side of said slicing disc and having downwardly extending portions somewhat remotely spaced from the lateral portions of said expressing rolls, curved portions approaching said expressing rolls and merging into substantially horizontal portions in close proximity to the under sides of said expressing rolls.

7. A fruit cutting and juice expressing machine having in combination, a supporting frame, an impeller rotatably mounted in said frame for urging fruit into said machine, a rotary slicing disc against which said fruit gravitates and is urged by said impeller to cut said fruit in half, an arcuate guide along which the fruit is led and urged by said impeller toward and against said slicing disc, a pair of expressing plates upon which each half of the fruit is guided after being cut in half by said rotary slicing disc, and a pair of expressing rolls operating in conjunction with said expressing plates to extract the juice from said fruit, said expressing plates having their upper portions resting adjacent either side of said slicing disc and having downwardly extending portions somewhat remotely spaced from the lateral portions of said expressing rolls, curved portions approaching said expressing rolls and merging into substantially horizontal portions in close proximity to the under sides of said expressing rolls.

8. A fruit cutting and juice expressing machine having in combination, a supporting frame, an impeller rotatably mounted in said frame for urging fruit into said machine, a rotary slicing disc against which said fruit gravitates and is urged by said impeller to cut said fruit in half, an arcuate guide along which the fruit is led and urged by said impeller toward and against said slicing disc, expressing plates upon which each half of the fruit is received, and expressing rolls operating in conjunction with said plates to extract the juice from said fruit.

9. A fruit cutting and juice expressing machine having in combination, a supporting frame, an impeller rotatably mounted in said frame for urging fruit into said machine, a rotary slicing disc against which said fruit gravitates and is urged by said impeller to cut said fruit in half, an arcuate guide along which the fruit is led and urged by said impeller toward and against slicing disc, expressing plates upon which each half of the fruit is received, guides for leading said fruit from said arcuate guide to said expressing plates, and expressing rolls operating in conjunction with said plates to extract the juice from said fruit.

10. A fruit-cutting and juice-expressing machine having in combination, a supporting frame, an impeller mounted in the upper part of said frame and having means thereon for conveying and urging fruit into said machine, a rotary slicing disc having its axis parallel to the axis of said impeller and against which said fruit gravitates and is urged by said impeller to cut said fruit in half, expressing plates upon which each half of the fruit is received after being cut by said slicing disc, expressing rolls having their axes at substantially right angles to the axes of said impeller and said rotary cutting disc, a plurality of ejecting fins mounted on said expressing rolls, said fins extending parallel with the axes of said expressing rolls, said expressing rolls operating in conjunction with said expressing plates to extract the juice from said fruit, and means for rotating said impeller, said rotary slicing disc and said expressing rolls.

11. A fruit-cutting and juice-expressing machine having in combination, means for automatically cutting the fruit in half, a pair of expressing plates upon which each half of the fruit is guided, a pair of expressing rolls operating in conjunction with said expressing plates to extract the juice from said fruit, said expressing plates having downwardly extending portions somewhat remotely spaced from the lateral portions of said expressing rolls, curved portions approaching said expressing rolls and merging into substantially horizontal portions in close proximity to the under sides of said expressing rolls, a plurality of ejecting fins mounted on said expressing rolls, said fins extending parallel with the axes of said expressing rolls, and being of a depth substantially equal to the distance between the expressing rolls and expressing plates where they are in close proximity to each other.

12. A fruit-cutting and juice expressing machine having in combination a supporting frame, an impeller rotatably mounted in said frame for urging fruit into said machine, a rotary slicing disc against which said fruit gravitates and is urged by said impeller to cut said fruit in half, a pair of expressing plates upon which each half of the fruit is guided after being cut in half by said rotary slicing disc, a pair of expressing rolls operating in conjunction with said expressing plates to extract the juice from said fruit, said expressing plates having their upper portions resting adjacent either side of said slicing disc and having downwardly extending portions somewhat remotely spaced from the lateral portions of said expressing rolls, curved portions approaching said expressing rolls and merging into substantially horizontal portions in close proximity to the under sides of said expressing rolls, a plurality of ejecting fins mounted on said expressing rolls, said fins extending parallel with the axes of said expressing rolls, and being of a depth substantially equal to the distance between the expressing rolls and expressing plates where they are in close proximity to each other.

NATHANIEL EASTMAN.

REFERENCES CITED

The following references are of record in the file of this patent:

UNITED STATES PATENTS

| Number | Name | Date |
| --- | --- | --- |
| 1,600,882 | Jacobson | Sept. 21, 1926 |
| 2,205,059 | Clark | June 18, 1940 |
| 2,332,177 | Smith | Oct. 19, 1943 |
| 2,362,126 | Fry | Nov. 7, 1944 |
| 2,382,620 | Eastman | Aug. 14, 1945 |